Figure 1:
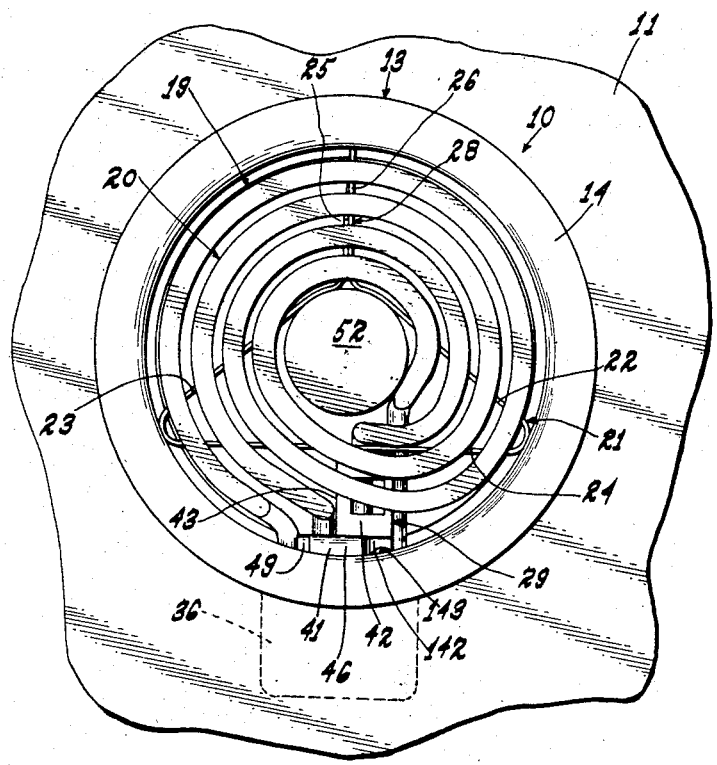

March 10, 1959

J. C. McORLLY ET AL 2,877,334

ELECTRIC HEATERS

Filed July 24, 1956

9 Sheets—Sheet 1

INVENTORS
JOSEPH McORLLY
G. EDWARD AMMERMAN
BY
ATTORNEY

March 10, 1959

J. C. McORLLY ET AL 2,877,334

ELECTRIC HEATERS

Filed July 24, 1956

9 Sheets-Sheet 2

INVENTORS
JOSEPH McORLLY
G. EDWARD AMMERMAN
BY
ATTORNEY

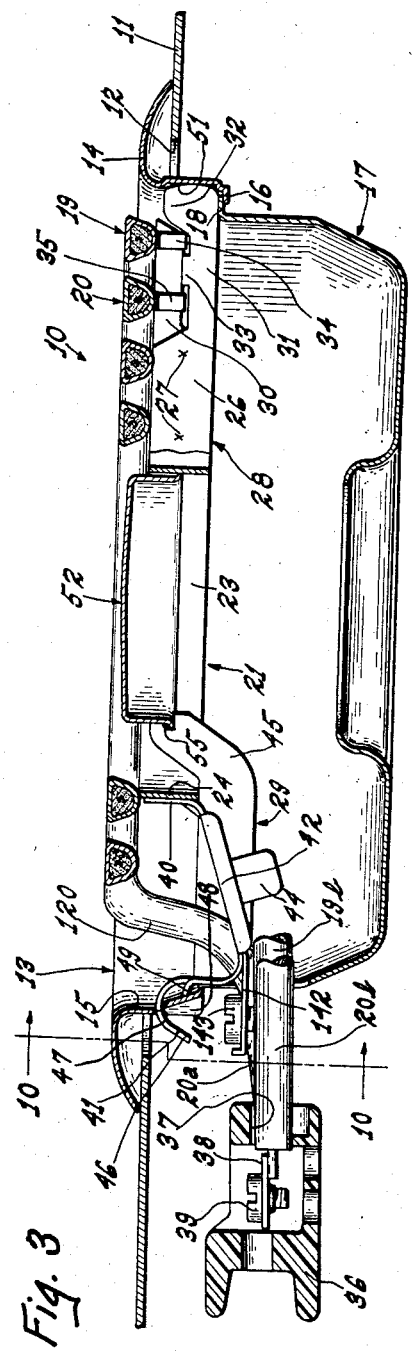

March 10, 1959

J. C. McORLLY ET AL 2,877,334

ELECTRIC HEATERS

Filed July 24, 1956

9 Sheets—Sheet 4

INVENTORS
JOSEPH McORLLY
G. EDWARD AMMERMAN
BY
ATTORNEY

March 10, 1959

J. C. McORLLY ET AL 2,877,334

ELECTRIC HEATERS

Filed July 24, 1956

9 Sheets-Sheet 5

INVENTORS.
JOSEPH McORLLY
G. EDWARD AMMERMAN
BY
ATTORNEY

March 10, 1959

J. C. McORLLY ET AL 2,877,334

ELECTRIC HEATERS

Filed July 24, 1956

9 Sheets-Sheet 6

INVENTORS.
JOSEPH McORLLY
G. EDWARD AMMERMAN
BY
ATTORNEY

March 10, 1959

J. C. McORLLY ET AL 2,877,334

ELECTRIC HEATERS

Filed July 24, 1956

9 Sheets—Sheet 7

INVENTORS.
JOSEPH McORLLY
G. EDWARD AMMERMAN
BY
ATTORNEY

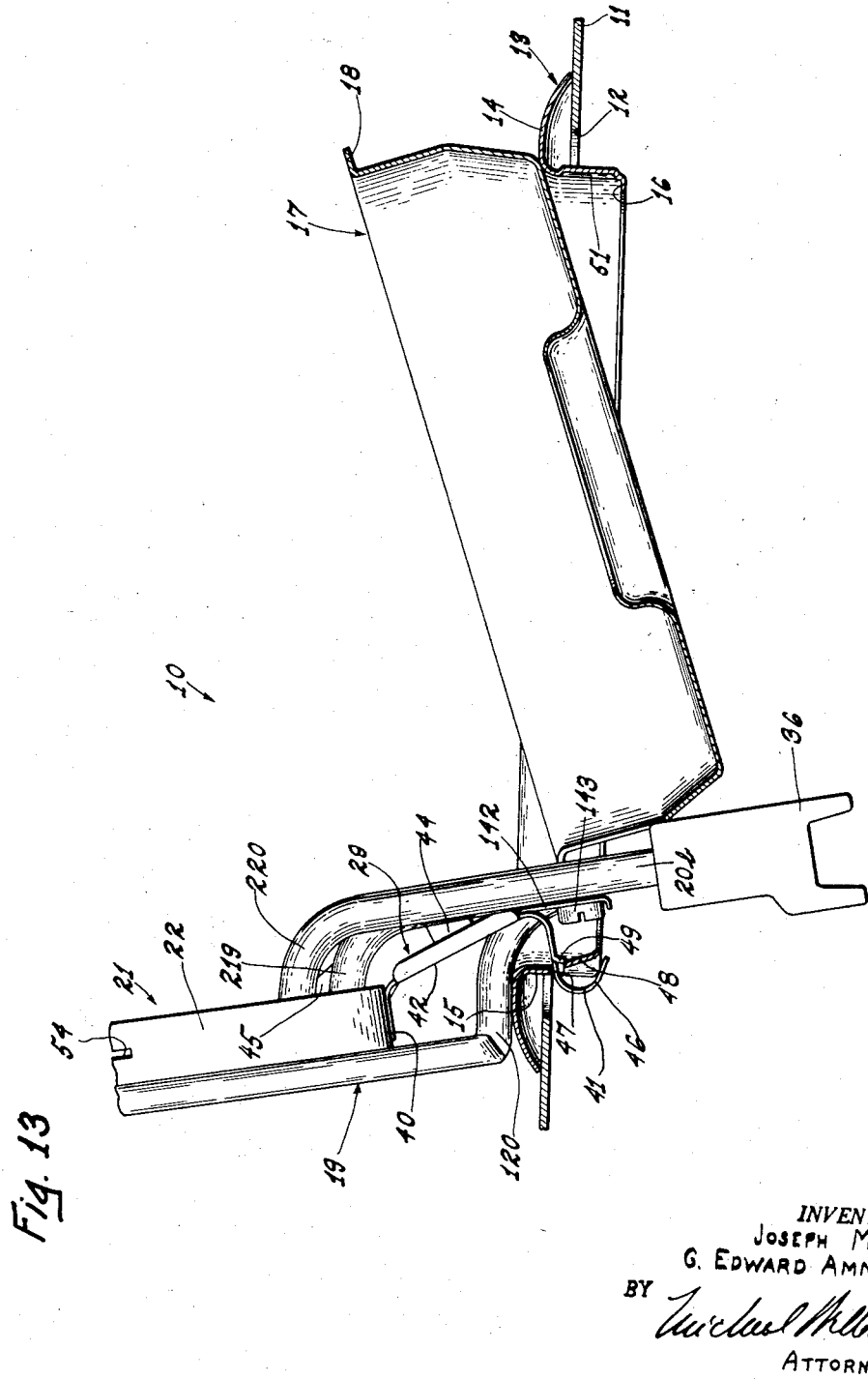

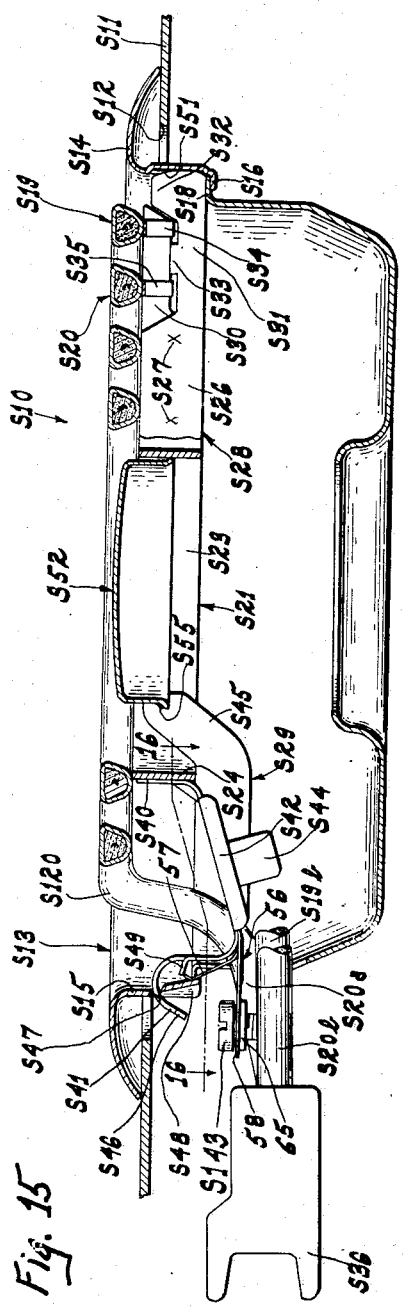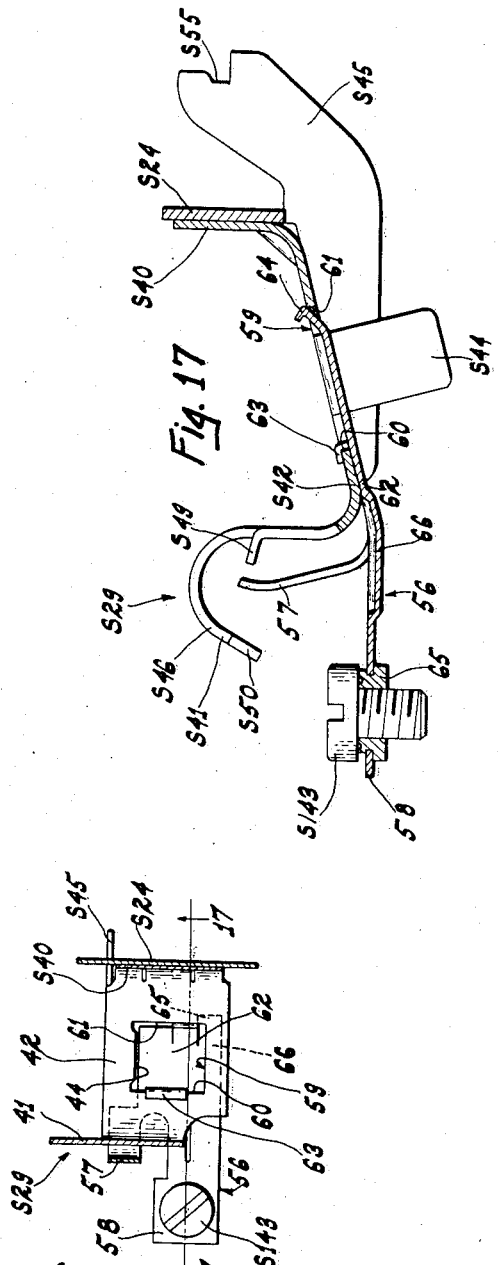

United States Patent Office 2,877,334
Patented Mar. 10, 1959

2,877,334

ELECTRIC HEATERS

Joseph C. McOrlly, Wilkinsburg, and George Edward Ammerman, Oakmont, Pa., assignors to Edwin L. Wiegand Company Application July 24, 1956, Serial No. 599,825

35 Claims. (Cl. 219—37).

The present invention relates to electric heaters, more particularly to surface type electric heating units used in ranges and the like, and the principal object of the invention is to provide new and improved heaters of such character.

Most present day range top heating units are of the tubular sheathed type wherein a heat generating resistor conductor is encased in a tubular metallic sheath which is filled with compacted refractory material. With the modern trend toward smaller diameter sheathed elements, in order to reduce the time lag of the element in heating up and cooling off, the means for supporting these smaller and consequently less rigid elements has assumed increased importance. It is therefore an object of the present invention to provide effective supporting means capable of being manufactured at low cost and capable of being assembled with the heating element with a minimum of expensive labor.

The present invention has certain other advantages over many prior art range top heating units. For example, most range top units are formed of two separate heating elements which may be energized simultaneously or separately depending upon the heat required. In many of the present day heating units these two elements are secured together as a unit with the supporting means so that in the event one element burns out, both elements must be replaced. This, it will be appreciated, greatly increases repair costs. With the instant invention, either of the heating elements may be easily and quickly replaced without special tools.

Another advantage of the present invention is that while the heating element is carried by the usual trim ring which is seated in the range top and is pivotable with respect to the trim ring to provide for easy access to the usual underlying drip pan to facilitate cleaning thereof, the element is easily separable from the trim ring, without the use of tools, so that such ring may also be removed from the range and easily cleaned.

These and other advantages will readily become apparent from a study of the following description and from the drawings appended hereto.

Figure 4:
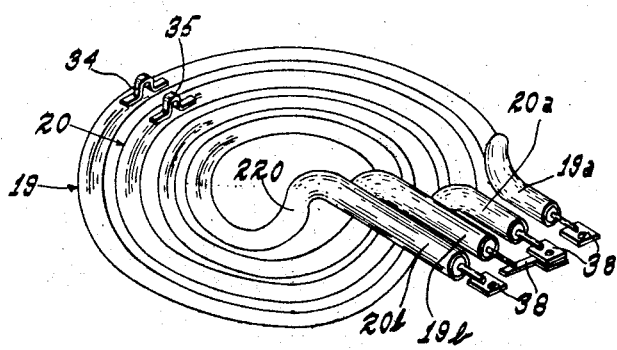
Figure 2:
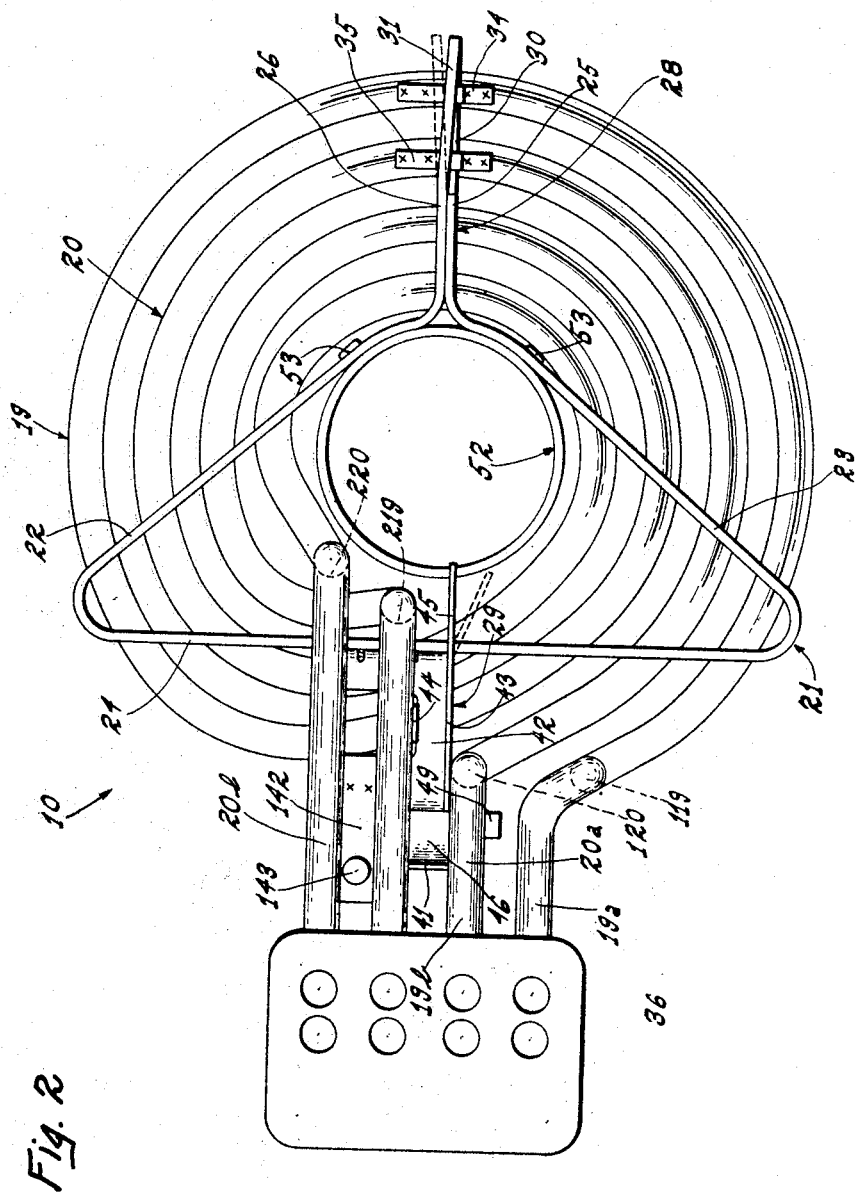
Figure 10:
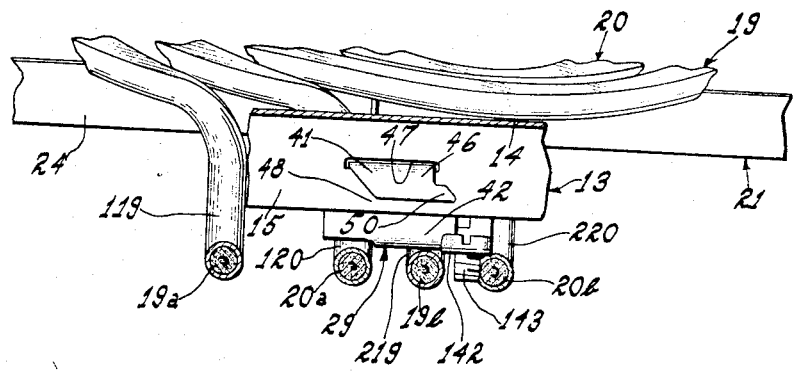
Figure 11:
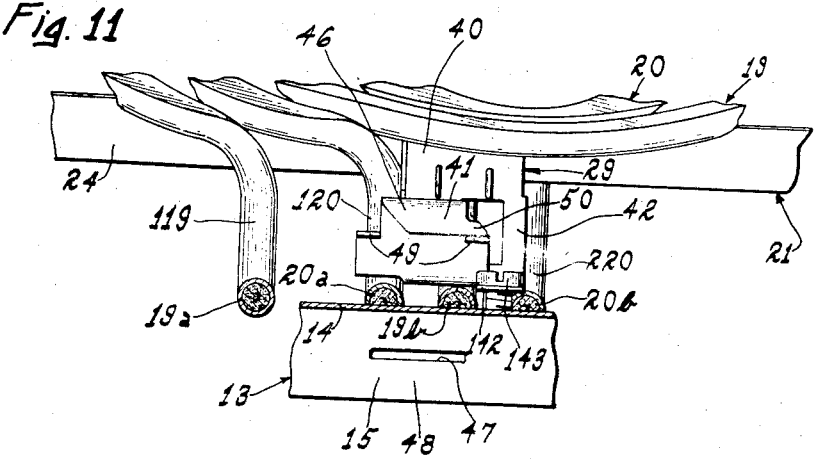
Figure 9:
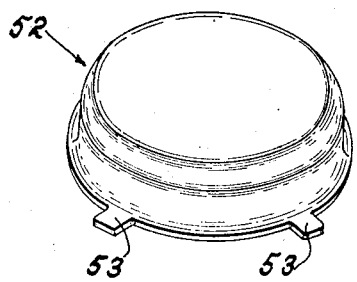
Figure 12:
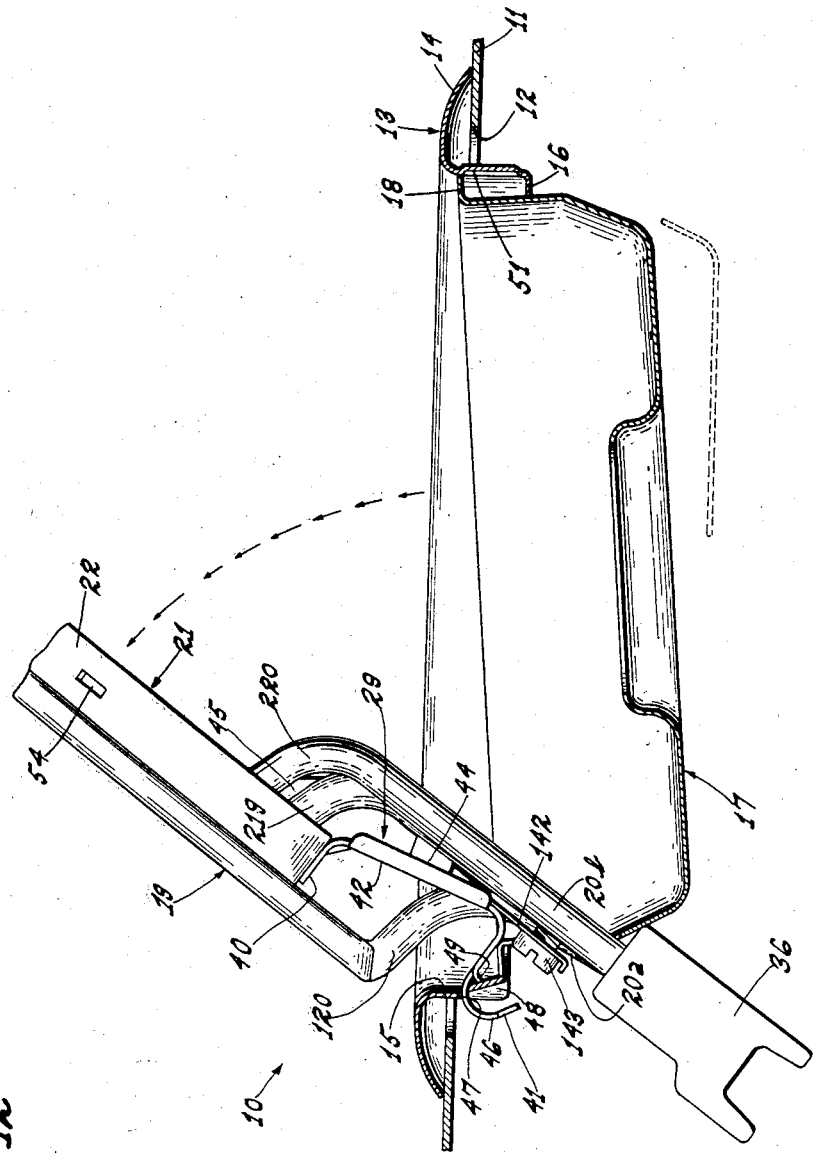

In the drawings accompanying this specification and forming a part of this application there are shown, for purpose of illustration, embodiments which the invention may assume, and in these drawings:

Figure 1 is a fragmentary, top plan view of a range incorporating a surface heating unit constructed in accordance with the present invention, Figure 2 is an enlarged bottom plan view, Figure 3 is an enlarged side elevational view, partially insection, of the heating unit illustrated in Figures 1 and 2, Figure 4 is a reduced size bottom side perspective view of the heating elements of the present invention prior to assembly with certain other parts, Figures 5, 6, 7 and 8 are views similar to Figure 4 but illustrating progressive stages of assembly of the heating elements with certain other parts, Figure 9 is a perspective view of a detail, Figure 10 is a sectional view generally corresponding to the line 10—10 of Figure 3, Figure 11 is a view similar to Figure 10 but with the parts separated slightly, Figure 12 is a view similar to Figure 3 but with parts in another position, Figure 13 is a view similar to Figure 12 but with parts in still another position, Figure 14 is a view similar to Figure 3 but with one part removed and with other parts positioned for separation to the dot dash line position, Figure 15 is a view similar to Figure 3 but of another embodiment, Figure 16 is a fragmentary sectional view generally corresponding to the line 16—16 of Figure 15, and Figure 17 is an enlarged fragmentary view generally corresponding to the line 17—17 of Figure 16.

As best shown in Figures 1 and 3, the present heating unit 10 is adapted to be carried by the top 11 of a range. The top 11 of the range has the usual aperture 12 in which a trim ring 13 is adapted to be positioned. Although not shown, trim ring 13 may carry suitable clips which frictionally hold the ring in place in aperture 12 while permitting the ring to be removed for cleaning or other purposes.

Trim ring 13 (see especially Figure 14) is conventional in that it comprises a decorative, upper annular flange portion 14 which rests upon and is supported by range top 11; a generally vertically disposed, depending annular skirt portion 15 which projects through aperture 12; and an inwardly directed, lower annular flange portion 16. The usual drip pan 17, having a radially outwardly extending annular flange portion 18, is removably supported by flange portion 16 of the trim ring (see Figure 3).

The present invention employs a pair of heating elements 19, 20 of the well-known tubular sheathed type (see Figures 1 and 4). Each element comprises an elongated tubular metallic sheath filled with compacted refractory material and having a resistor conductor embedded within the refractory material intermediate the sheath ends to provide a heat generating portion and having terminal conductor members connected to respective ends of the resistor conductor within the sheath and extending from respective sheath ends to provide for making the necessary electrical connections to the elements. In the present construction, the projecting portion of each terminal conductor member has a terminal lug 38 secured thereto and each terminal lug is provided with a threaded aperture for receiving a terminal screw 39.

Each element has its intermediate heat generating portion spiraled to provide a plurality of convolutions and the convolutions of each element are adapted to be arranged concentrically with each other and are adapted to be positioned generally horizontally for supporting a vessel to be heated. For reasons to become clear, terminal end portions 19a, 19b of element 19 and terminal end portions 20a, 20b of element 20 are disposed in spaced side by side relation (see especially Figure 4) beneath the heat generating portions of the elements and to one side thereof. Note that terminal end portions 19a, 20a (see Figure 2 in particular) have portions 119, 120 which extend downwardly from the outermost convolutions of respective elements while terminal end portions 19b, 20b have portions 219, 220 which extend downwardly from the innermost convolutions of respective elements.

Elements 19, 20 are adapted to be secured to supporting means 21, commonly known as a spider, which underlies and supports the heat generating portions of the elements in the latter's vessel-supporting position and which is in turn adapted to be supported by the trim ring 13. It is an important feature of the present invention that while the elements and the spider are secured together, each element is free to expand and contract individually as its temperature changes. Further, the elements are secured to the spider without special tools and without the use of separate intervening locking parts. Moreover, each element may be individually replaced in the field, without the added expense of replacing any other parts, in the event one element fails.

Spider 21, as best seen in Figures 2 and 5 through 8, is presently formed of a single metallic strip to reduce assembly costs attendant with most prior art spiders formed of a plurality of pieces which must be carefully aligned to provide a flat seat for the convolutions of the heating element and then secured together at a plurality of places. The strip is formed to provide a three sided figure having legs 22, 23 and 24. Respective ends 25, 26 of the strip are disposed in side by side relation and welded at 27, or otherwise secured together, to provide a unitary structure which is highly resistant to deflection in a direction from edge to edge of the strip. Note that strip ends 25, 26 provide a fourth leg 28 which extends outwardly from the junction of legs 22, 23 of the closed figure. For a purpose to be disclosed, a bracket structure 29 is welded or otherwise secured to leg 24 of the spider.

Figure 5:
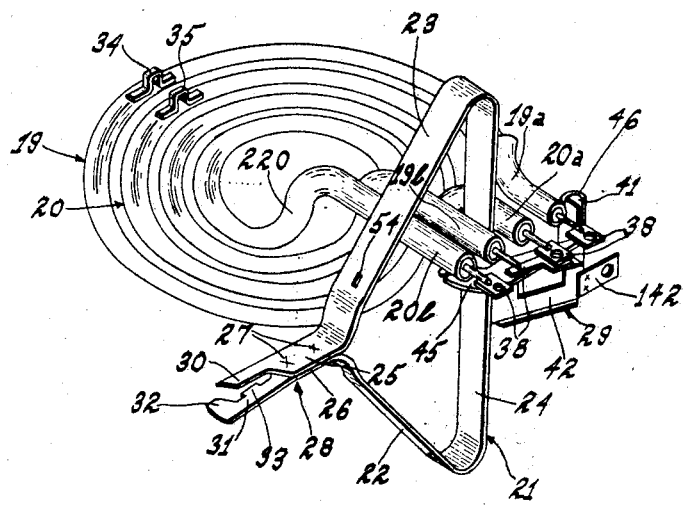

In the position of parts shown in Figure 3, but as also may be seen in Figure 5, strip end portions 25, 26 are formed to provide respective, vertically spaced-apart prongs 30, 31. Prong 31 has a transverse enlargement 32 at its free end which extends, as shown, beyond the free end of prong 30, and also has an abutment 33 intermediate its ends for engagement, at final assembly, with the under edges of prong 30.

As best seen in Figure 4, the underside of the portion of the outermost convolution of each element 19, 20 (disposed generally opposite respective terminal end portions 19a, 19b, 20a and 20b) has respective depending loop members 34, 35 welded or otherwise secured thereto, and each loop member is of a size to slidably receive prong 30 of the spider.

When assembling the spider 21 with the elements 19, 20, prong 31 of the spider will be positioned as shown by dot dash lines in Figure 2. The elements 19, 20 will be inverted and positioned concentrically as shown in Figures 4 and 5, and legs 24 of the spider slipped between adjoining terminal end portions 19b, 20a of the elements. Note that in this first stage of assembly, leg 24 is positioned generally vertically and bracket structure 29 is positioned below the terminal end portions of the elements.

Figure 6:
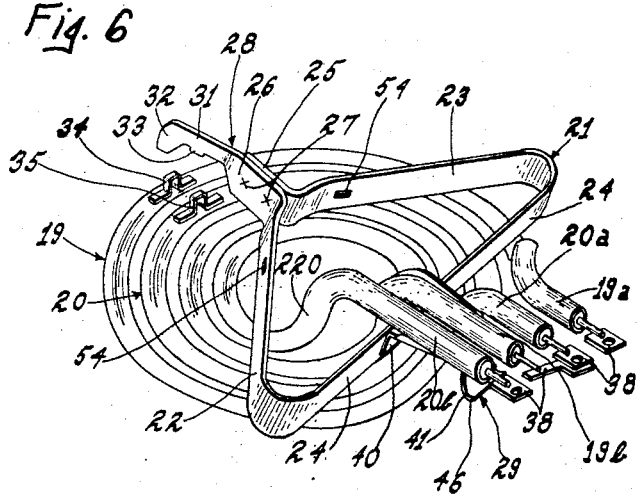
Figure 7:
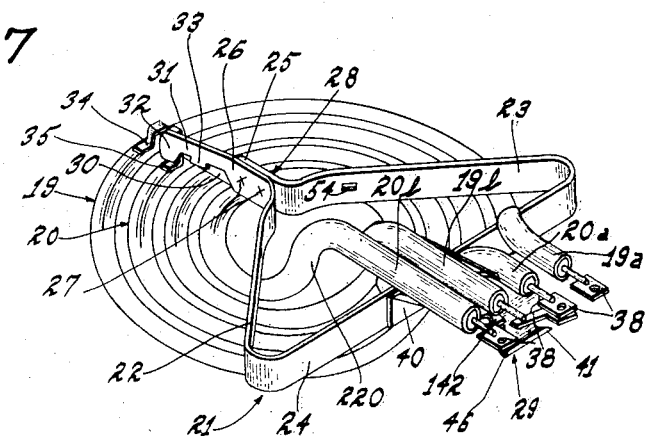
Figure 8:
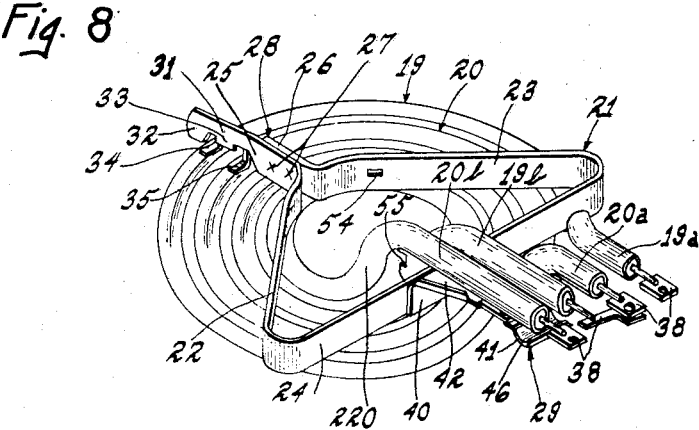

The spider will next be rotated through the position shown in Figure 6 to the position shown in Figure 7 wherein all of the legs of the spider are lying flat on the convolutions of the elements and wherein the spider is positioned so that leg 24 is closely adjacent portions 119, 120 of terminal end portions 19a, 20a.

Prong 30 will next be aligned with loop members 34, 35 and the spider then moved in a direction toward the loop members to position prong 30 therethrough. Prong 31 will then be bent from its dot dash line position shown in Figure 2 to its full line position. As illustrated in Figure 3, enlargement 32 will prevent withdrawal of prong 30 from the loop members and abutment 33 will maintain the loop members and the convolutions to which they are secured in the proper spaced relation. Abutment 33 also provides for mutual support between the prongs to insure against their vertical deflection in the event that an excessive amount of weight is placed upon the heating unit.

After the spider 21 is assembled with the heating elements, a terminal block 36 will be positioned over the terminal ends of the heating elements to protect the electrical connections thereto. The block has apertures 37 for receiving respective terminal ends of the elements and the terminal lugs 38 carried by respective terminal ends. When the terminal screws are secured to their respective terminal lugs, the block will be held upon the terminal ends of the element against disassembly therefrom.

As in conventional two element range top heating units, a common electrical connection is provided between the elements 19, 20. At the present time, the terminal lugs 38 carried by adjoining terminal end portions 20a, 19b are adapted to be secured together (see Figure 4) by means of a terminal screw. Although not shown, it will be understood that the usual current carrying lead wires will be connected to the heating elements by means of the terminal screws.

The previously mentioned bracket structure 29 comprises a portion 40 welded or otherwise secured to leg 24 of the spider, a tongue portion 41, and an intermediate channel shaped portion 42 (see Figures 3 and 5 through 8). This bracket structure serves several purposes. Firstly, it overlies terminal end portions 19b, 20b (see Figures 3, 10 and 11) and restricts elevation of such ends and consequent elevation of the adjoining heat generating element portions from which such end portions extend. Accordingly, such adjoining heat generating portions are restricted against movement away from the spider. Moreover, since all of the elements ends are connected together by the terminal block 36, the remaining terminal ends will also be restricted against movement.

Secondly, one edge 43 of the bracket structure abuts terminal end portion 20a while a depending tab 44 which is struck out therefrom abuts terminal end 19b (see Figure 2). As will readily be apparent, this maintains the bracket structure in alignment with the terminal end portions of the heating elements.

Thirdly, one of the flanges of intermediate portion 42 is enlarged to provide a finger 45 for a purpose to be disclosed. In the embodiment disclosed in Figures 1–14, a tab 142 is welded or otherwise secured to the bracket assembly and carries a screw 143 and a suitable ground wire is adapted to be held by the screw for grounding the unit.

Fourthly, tongue portion 41 cooperates with a portion of trim ring 13 to provide a hinge about which the heating elements and spider assembly is shiftable from the position shown in Figure 3 to the position shown in Figure 13.

Tongue 41 extends upwardly from intermediate portion 42 of bracket structure 29 and the free end of the tongue is presently formed to provide an inverted hook 46. Hook 46 is adapted to extend through a horizontal slot 47 formed in skirt portion 15 of the trim ring and the portion 48 of the trim ring underlying the slot is presently formed inwardly toward the center of the trim ring to facilitate assembly of the loop therewith. Note that portion 48 of the trim ring provides an abutment or pintle-like member about which the hook is rotatable and that the slot is of a length to pass the hook with a minimum of clearance. Note also that the opening into the hook provides for assembly and disassembly of the hook with the pintle-like member.

Disposed on opposite sides of hook 46 are tabs 49 (see especially Figures 3 and 11) which provide abutments which engage with the trim ring and limit extension of the hook therethrough (see also Figures 12 and 13).

In order to prevent unintentional separation of the hook with the trim ring, one side of the free end of the hook (see Figures 10 and 11) is herein shown provided with a finger 50 which engages behind the trim ring.

With the parts assembled as shown in Figure 3, the lower edge of spider 21 rests upon flange portion 18 of the drip pan which is in turn supported by flange 16 of the trim ring. In the embodiment thus far disclosed, tabs 49 are in engagement with the trim ring to force abutment 32 of spider leg 28 into an indentation 51 formed in the trim ring.

When it is desired to elevate the elements from their normal use position illustrated in Figure 3, the right-hand side of the elements will be grasped by the user and moved upwardly. Abutment 32 will pull out of indentation 51, leg 24 of the spider preferably deflecting slightly in this embodiment to permit removal of the abutment from the indentation. As the elements are rotated about the hinge provided by hook 46 and pintle 48, the terminal ends of the element will bear against one side of the drip pan and force the latter from its seat (see Figure 12). With the elements positioned as shown in Figure 13, the drip pan may easily be removed for cleaning purposes, the elements remaining in their elevated position because their center of gravity is to the left of the hinge, as will be evident from the drawings.

If it is desired to remove the elements from the trim ring to permit removal of the latter from the range so that normally inaccessible parts may be cleaned, the element and spider assembly will be moved to the position shown in Figure 14 and such assembly and the trim ring then slightly shifted in a sidewise manner to align finger 50 with slot 47 and thereafter shifted vertically to disengage the hook from the trim ring, as indicated by Figure 11 and by the dot dash lines of Figure 14. The elements may then be dropped through the trim ring to rest upon the shelf (not shown) which normally underlies the top of the range and the trim ring then removed from the range aperture. As will readily be apparent, reassembly will be effected by reversing the above described operations.

As shown in Figures 1, 2 and 3, a body such as a medallion is frequently positioned in the center of the convolutions of the heating element to impart a more finished appearance thereto. The medallion may, if desired, carry a suitable identifying trade name or trademark.

In the present embodiment, the medallion 52 (see Figure 9) is a shallow cup-shaped member having a pair of tabs 53 extending radially outwardly from its lip portion and preferably spaced apart less then 90°. Converging legs 22, 23 of the spider provide a pocket adjacent the junction of the legs and as best seen in Figures 2 and 3, the medallion is adapted to be positioned within such pocket with tabs 53 projecting through respective apertures 54 (see Figure 6) formed in legs 22, 23. Finger 45 will then be bent from its dot dash line position shown in Figure 2 to its full line position to provide, with the tabs 53, a three point support for the medallion. As best seen in Figure 3, finger 45 is notched at 55 to closely engage about the lip portion of the medallion and prevent its disassembly from the spider.

It will readily be apparent that the medallion may be omitted from the spider if the customer so desires. One reason for elimination of the medallion might be to provide room for the sensing element of a thermostat assembly which would be positioned in the center of the convolutions. In certain constructions, the medallion may be replaced by a suitable sleeve member (not shown) in which such sensing element is adapted to be positioned. It will be appreciated that the sleeve member may be designed with radially extending tabs (such as the tabs 53) and with a lip portion so that it may be held assembled with the spider in a manner similar to that of the medallion.

The embodiment illustrated in Figures 15, 16 and 17 is similar to the one heretofore disclosed; accordingly, similar parts are identified with similar reference characters but with the prefix s added.

Under certain circumstances, leg s24 of the spider s21 may not have the requisite resiliency to yieldably maintain enlargement s32 of the spider in indentation s51 formed in trim ring s13. In such circumstances, the spider will carry a clip, or resilient member, 56 providing a resilient finger 57 which engages portion s48 of the trim ring and yieldably urges the spider in a direction to urge portion s32 thereof to seating relation in indentation s51 (see Figure 15). It is preferable, at the present time, to so form resilient member 56 that it provides a tab 58, similar in function to tab 142, to which a ground wire (not shown) may be secured.

Resilient member 56 may be secured to spider s21 in any suitable manner; however, to reduce assembly costs and to provide for ease of replacement in the field, it is preferable to form this member so that it may be spring-engaged with bracket structure s29. As best seen in Figure 16, intermediate portion s42 of the bracket structure has tab s44 struck therefrom thus leaving an aperture 59 in the bracket structure having opposite margins 60 and 61. Member 56 has a portion 62 which underlies the intermediate portion of the bracket structure and provides an L-shaped tab 63 which is adapted to hook over margin 60 of aperture 59 to thus accurately locate the member relative to the bracket structure and to hold the left end of the member (as viewed in Figure 17) closely against the bracket structure. Portion 62 of member 56 also has a prong 64 which is adapted to be sprung over margin 61 of the aperture to thus resiliently maintain member 56 assembled with the bracket structure. Note that member 56 extends beyond marginal edges of aperture 59 at 65 and 66 to prevent the right hand end of the member from passing through the aperture. Intermediate portion 42 of bracket structure s29 is channel shaped (as previously mentioned with respect to the earlier disclosed embodiment) and at least a part of portion 62 of member 56 is of a width to just fit between the flanges of such intermediate portion to thereby accurately locate the member between such flanges.

Tab 58 of resilient member 56 (see Figure 17) has a nut 65 crimped or otherwise suitably secured thereto for receiving the ground wire connecting screw s143. This tab also has one or more ribs 66 embossed therein for strengthening purposes.

In view of the foregoing it will be apparent to those skilled in the art that we have accomplished at least the principal object of our invention and it will also be apparent to those skilled in the art that the embodiments herein described may be variously changed and modified, without departing from the spirit of the invention, and that the invention is capable of uses and has advantages not herein specifically described, hence it will be appreciated that the herein disclosed embodiments are illustrative only, and that our invention is not limited thereto.

We claim:

1. A range top heating unit comprising an elongated generally rigid sheathed electric heating element having an intermediate heat generating portion providing a plurality of convolutions adapted to be positioned generally horizontally for supporting a vessel to be heated, said heating element having terminal end portions extending from respective ends of said intermediate portion and one of said end portions extending generally horizontally and being disposed beneath and at one side of said convolutions, support means underlying and supporting said heating element in its vessel supporting position and in turn adapted to be supported by the range, interengageable means in part provided by said support means and in part provided by that part of the heat generating portion of said element which is spaced generally opposite said one end portion for holding such interengaged part of said heat generating portion in position adjacent said support means, and bracket means carried by said support means in part providing a pivot about which said support means and said element are shiftable toward and away from vessel supporting position, said bracket means having a portion providing an abutment which overlies and is engageable with said end portion to restrict elevation thereof relative to said support means and consequent elevation of the adjoining portion of said heat generating portion.

2. A range top heating unit comprising an elongated generally rigid sheathed electric heating element having an intermediate heat generating portion formed to provide a plurality of convolutions lying in a substantially common plane and adapted to be positioned generally horizontally for supporting a vessel to be heated, said element having spaced-apart first terminal end portions one of which extends downwardly from the outermost convolution of said heat generating portion and the other of which extends downwardly from the innermost convolution of said heat generating portion, said element further having second terminal end portions disposed beneath said heat generating portion and extending from respective first portions in spaced side by side relation in a direction generally edgewise of said heat generating portion, support means having a plurality of legs underlying and supporting said heating element in its vessel supporting position and in turn adapted to be supported in a predetermined position by the range, one leg of said support means extending transversely of the terminal end portions of said heating element and being disposed between the spaced first terminal end portions thereof, interengageable means in part provided by said support means and in part provided by that part of the heat generating portion of said element which is spaced generally opposite the latter's terminal end portions for holding the former element portion in position adjacent said support means, and bracket means carried by said one leg of said support means and in part providing a pivot about which said support means and said element are shiftable toward and away from vessel supporting position, said bracket means overlying one of the second terminal end portions of said element and restricting elevation of said portion and consequent elevation of the adjoining heat generating portion of said element relative to said support means.

3. A range top heating unit comprising an elongated sheathed electric heating element having an intermediate heat generating portion providing a plurality of convolutions adapted to be positioned generally horizontally for supporting a vessel to be heated, said heating element having terminal end portions extending from respective ends of said intermediate portion and one of said end portions being disposed beneath and at one side of said convolutions, four legged support means formed of a single elongated strip of material positioned on edge and having longitudinally spaced portions so formed and secured together to provide a closed three sided figure each side of which forms a supporting leg, the fourth leg being provided by a terminal end portion of said strip material and such leg extending outwardly of said three sided figure and from the junction of two of its legs, the legs of said support means underlying and supporting the convolutions of said heating element in its vessel supporting position and said supporting means in turn being adapted to be supported by the range, interengageable means in part provided by the fourth leg of said support means and in part provided by that part of the heat generating portion of said element which is spaced generally opposite said one end portion for holding such interengaged part of said heat generating portion in position adjacent said support means, and abutment means carried by the support means leg spaced furthest from said fourth leg for engagement with said one end portion to restrict movement of the latter and consequent movement of the adjoining part of said heat generating portion relative to said support means.

4. A range top heating unit comprising an elongated sheathed electric heating element having a heat generating portion formed to provide a plurality of convolutions adapted to be positioned generally horizontally for supporting a vessel to be heated, support means underlying and supporting said heating element in its vessel supporting position and in turn adapted to be supported by the range, said support means having a pair of legs disposed in converging relation to provide a pocket, body means positioned within the pocket provided by said support means legs, and abutment means carried by said support means and positioned for engagement with said body means to maintain the latter within said pocket, said abutment means being shiftable to a position disengaged from said body means to provide for assembly and disassembly thereof with said support means.

5. A range top heating unit comprising an elongated sheathed electric heating element having a heat generating portion formed to provide a plurality of convolutions adapted to be positioned generally horizontally for supporting a vessel to be heated, support means underlying and supporting said heating element in its vessel supporting position and in turn adapted to be supported by the range, said support means having a pair of legs disposed in converging relation to provide a pocket and each leg having an aperture formed therein, body means positioned within the pocket provided by said support means legs and having a pair of spaced projections removably disposed within respective apertures in said legs, and a tongue carried by said support means and positioned for engagement with said body means to maintain the latter within said pocket, said tongue being bendable to a position disengaged from said body means to provide for assembly and disassembly thereof with said support means.

6. A range top heating unit comprising an electric heating element adapted to be positioned generally horizontally for supporting a vessel to be heated, means carried by the range providing a vertical wall formed with a horizontally extending slot, and a tongue carried by said element having a cross-sectional size slightly smaller than said slot and slidably fitting therewithin, said tongue and a defining margin of said slot providing a hinge about which said element is shiftable toward and away from the latter's vessel supporting position and said tongue being removable from said slot to provide for separation of said element from said range.

7. A range top heating unit comprising an electric heating element adapted to be positioned generally horizontally for supporting a vessel to be heated, means carried by the range providing a generally vertical wall formed with a horizontally extending slot, and a tongue carried by said element having a cross-sectional size slightly smaller than said slot and adapted to be inserted therein for extension beyond said wall, said tongue and a defining margin of said slot providing a hinge about which said element is shiftable toward and away from the latter's vessel supporting position and said tongue being removable from said slot to provide for separation of said element from the range, the portion of said tongue extending beyond said wall having a finger on one side which is engageable with said wall to prevent unintentional withdrawal of said tongue from said slot, said finger being disengaged from said wall to provide for withdrawal of said tongue from said slot by shifting said element in a direction to align said finger with said slot.

8. A range top heating unit comprising an electric heating element adapted to be positioned generally horizontally for supporting a vessel to be heated, means carried by the range providing a generally vertical wall formed with a horizontally extending slot, a tongue carried by said element having a cross-sectional size slightly smaller than said slot and adapted to be inserted therein for extension beyond said wall, said tongue and a defining margin of said slot providing a hinge about which said element is shiftable toward and away from vessel supporting position and said tongue being removable from said slot to provide for separation of said element from the range, first abutment means carried by the portion of said tongue which extends through said slot and engageable with said wall to prevent unintentional withdrawal of said tongue from said slot, and second abutment means carried by said tongue and engageable with said wall to limit extension of said tongue therebeyond, said first abutment means being disengaged from said wall to provide for withdrawal of said tongue from said slot by shifting said element in a direction to align said first abutment means with said slot.

9. A range top heating unit comprising an electric heating element adapted to be positioned generally horizontally for supporting a vessel to be heated, pintle means carried by the range and so disposed that its axis is generally horizontal, means carried by said element and providing an inverted hook adapted to be positioned over said pintle means to provide a hinge about which said element is shiftable toward and away from the latter's vessel supporting position, the opening into said hook being adapted to pass said pintle means to provide for ready disassembly of said element with the range by bodily raising said element from the range, first abutment means adjacent said pintle means for limiting movement of said hook axially of the latter, and second abutment means carried by and extending axially of said hook for engagement behind said first abutment means to prevent unintentional disassembly of said element from the range, said abutment means being disengaged to provide for disassembly of said element from the range by shifting said element in a direction to draw said second abutment means from behind said first abutment means.

10. A range top heating unit comprising an elongated sheathed electric heating element having an intermediate heat generating portion providing a plurality of convolutions adapted to be positioned generally horizontally for supporting a vessel to be heated, a depending loop member secured to the outermost convolution of said heating element, and support means having a leg underlying and supporting said heating element in its vessel supporting position and in turn adapted to be supported by the range, said support means leg having a bifurcated portion adjacent the outermost convolution providing a pair of relatively shiftable, vertically spaced-apart prongs, the uppermost prong being adapted to fit within said depending loop member and said lowermost prong having a transverse enlargement positioned for engagement with said loop member to restrict movement of the latter relative to said uppermost prong and consequent disassembly of said element from said support means when said prongs are disposed in predetermined positions, at least one of said prongs being shiftable away from its predetermined position to provide for assembly and disassembly of said heating element with said support means.

11. A range top heating unit comprising a generally rigid sheathed electric heating element having an intermediate heat generating portion providing a plurality of convolutions adapted to be positioned generally horizontally for supporting a vessel to be heated, said heating element having terminal end portions extending from respective ends of said intermediate portion and one of said end portions being disposed beneath and at one side of said convolutions, a depending loop member secured to the outermost convolution of said heating element, support means having a leg underlying and supporting said heating element in its vessel supporting position and in turn adapted to be supported by the range, said support means leg having a bifurcated portion adjacent that part of the outermost convolution of said heat generating portion which is generally opposite said one end portion and providing a pair of relatively shiftable, vertically spaced prongs, the uppermost prong being adapted to fit within said depending loop member and said lowermost prong having a transverse enlargement positioned for engagement with said loop member to restrict movement of the latter relative to said uppermost prong and consequent disassembly of said element from said support means when said lowermost prong is disposed in a predetermined position, said lowermost prong being shiftable away from its predetermined position to provide for assembly and disassembly of said heating element with said support means, and abutment means carried by said support means for engagement with said one end portion and restricting movement of the latter and consequent movement of the adjoining part of said heat generating portion relative to said support means.

12. A range top heating unit comprising a pair of elongated generally rigid sheathed electric heating elements each having an intermediate heat generating portion formed to provide a plurality of spiral-like convolutions, said heat generating portions being disposed generally concentrically and being adapted to be positioned generally horizontally for supporting a vessel to be heated, each element further having terminal end portions extending from respective ends of its intermediate portion and said terminal end portions being disposed beneath said convolutions in spaced side by side relation and extending in a direction generally edgewise of said convolutions, depending loop members secured to the underside of the outermost convolution of respective elements at a point generally opposite each element's terminal end portions, support means having a pair of interconnected legs underlying and supporting said convolutions in vessel supporting position and in turn adapted to be supported by the range, one of said legs being disposed adjacent said terminal end portions and extending transversely thereof and the other of said legs extending transversely of said one leg and having a bifurcated portion providing a pair of vertically spaced-apart prongs, the uppermost prong being adapted to slide through said loop members to secure said elements to said support and said lowermost prong having a transverse enlargement positioned for engagement with one of said loop members to restrict its movement relative to said prong and consequent disassembly of said elements from said support means when said lowermost prong is disposed in a predetermined position, said lowermost prong being shiftable away from its predetermined position to provide for assembly and disassembly of said heating elements with said support means to provide for individual replacement of said elements, and abutment means carried by said one leg of said support means for engagement with one of the end portions of each element to restrict movement of such end portions and consequent movement of the adjoining parts of respective heat generating portions relative to said support means.

13. A range top heating unit comprising a pair of elongated generally rigid sheathed electric heating elements each having an intermediate heat generating portion formed to provide a plurality of spiral-like convolutions, said heat generating portions being disposed generally concentrically and being adapted to be positioned generally horizontally for supporting a vessel to be heated, each element further having terminal end portions extending from respective ends of its intermediate portion and said terminal end portions being disposed beneath said convolutions in spaced side by side relation and extending in a direction generally edgewise of said convolutions, depending loop members secured to the underside of the outermost convolution of respective elements at a point generally opposite each element's terminal end portions, support means having a pair of interconnected legs underlying and supporting said convolutions and in turn adapted to be supported by the range, one of said legs being disposed adjacent said terminal end portions and extending transversely thereof and the other of said legs extending transversely of said one leg and having a bifurcated portion providing a pair of vertically spaced-apart prongs, the uppermost prong being adapted to slide through said loop members to secure said elements to said support and said lowermost prong having a transverse enlargement positioned for engagement with one of said loop members to restrict its movement relative to said prong and consequent disassembly of said elements from said support means when said lowermost prong is disposed in a predetermined position, said lowermost prong being shiftable away from its predetermined position to provide for assembly and disassembly of said heating elements with said support means to provide for individual replacement of said elements, pintle means carried by the range, and bracket means carried by said one leg of said support means and having a portion for engagement with one of the end portions of each element to restrict movement of such end portions and consequent movement of the adjoining parts of respective heat generating portions relative to said support means, said bracket means also having a portion providing a hook adapted to be positioned over said pintle means to provide a hinge about which said support means and said elements are shiftable toward and away from vessel supporting position, the opening into said hook being adapted to pass said pintle means to provide for ready disassembly of said elements with the range.

14. A range top heating unit comprising an electric heating element adapted to be positioned for supporting a vessel to be heated, means carried by the range and having a portion providing an abutment and having a portion spaced from said abutment, support means connected with and underlying and supporting said heating element in its vessel supporting position and in turn adapted to be supported by the range, said support means having a tongue overlying said abutment and cooperable therewith to provide a hinge about which said support means and said element are shiftable toward and away from vessel supporting position and said support means also having a portion which engages with said means portion spaced from said abutment, and a resilient finger carried by said support means and engageable with said abutment providing means portion to resiliently urge said support means portion to engagement with said means portion spaced from said abutment to releasably maintain said support means and the element connected thereto in vessel supporting position.

15. A range top heating unit comprising an electric heating element adapted to be positioned for supporting a vessel to be heated, means carried by the range and having a portion providing an abutment and having a portion spaced from said abutment, support means connected with and underlying and supporting said heating element in its vessel supporting position and in turn adapted to be supported by the range, said support means having a tongue overlying said abutment and cooperable therewith to provide a hinge about which said support means and said element are shiftable toward and away from vessel supporting position and said support means also having a portion which engages with said means portion spaced from said abutment, and resilient means carried by said support means and having a first portion sprung into interengagement with said support means to secure said resilient means thereto and a second portion which engages with said abutment providing means portion to resiliently urge said support means portion to engagement with said means portion spaced from said abutment to releasably maintain said support means and the element connected thereto in vessel supporting position.

16. A range top heating unit comprising an electric heating element adapted to be positioned for supporting a vessel to be heated, means carried by the range and having a portion providing an abutment and having a portion spaced from said abutment, support means connected with and underlying and supporting said heating element in its vessel supporting position and in turn adapted to be supported by the range, said support means having a tongue overlying said abutment and cooperable therewith to provide a hinge about which said support means and said element are shiftable toward and away from vessel supporting position and said support means also having a portion which engages with said means portion spaced from said abutment, and resilient means carried by said support means and having a first portion sprung into interengagement with said support means to secure said resilient means thereto, a second portion which provides for the connection of a ground wire to said resilient means, and a third portion which engages with said abutment providing means portion to resiliently urge said support means portion to engagement with said means portion spaced from said abutment to releasably maintain said support means and the element connected thereto in vessel supporting position.

17. A range top heating unit comprising an electric heating element adapted to be positioned for supporting a vessel to be heated, a trim ring carried by the range and having a depending annular flange, one portion of said flange having an aperture and a generally diametrically opposed portion of said flange having an indented portion, support means connected with and underlying and supporting said heating element in its vessel supporting position in turn adapted to be supported by said trim ring, said support means having a bracket which provides a tongue which passes through said aperture and cooperates with a defining margin thereof to provide a hinge about which said support means and said element are shiftable toward and away from vessel supporting position and said support means also having a portion which engages with the indented portion of said trim ring flange, and resilient means carried by said support means and having a first portion sprung into interengagement with said support means bracket to secure said resilient means thereto, a second portion which provides for the connection of a ground wire to said resilient means, and a third portion which engages with said trim ring flange adjacent said aperture to resiliently urge said support means portion to engagement with said indented portion of said trim ring flange to releasably maintain said support means and the element connected thereto in vessel supporting position.

18. A range top heating unit comprising an elongated sheathed electric heating element having a heat generating portion providing a plurality of convolutions adapted to be positioned generally horizontally for supporting a vessel to be heated, and support means supported by the range and underlying and supporting the convolutions of said element in the latter's vessel supporting position, said support means being formed of a single elongated piece of strip material bent transversely about an axis extending edgewise of the strip and at spaced places intermediate its ends to provide a plurality of legs and the free ends of said strip being joined together to provide a closed figure whose legs are positioned on edge and which is highly resistant to vertical deflection.

19. A range top heating unit comprising an elongated sheathed electric heating element having a heat generating portion providing a plurality of convolutions adapted to be positioned generally horizontally for supporting a vessel to be heated, and four legged support means supported by the range and underlying and supporting the convolutions of said element in the latter's vessel supporting position, said support means being formed of a single elongated piece of strip material bent transversely about an axis extending edgewise of the strip and at spaced places intermediate its ends and the ends of said strip being joined together to provide a three sided figure each side of which provides a respective leg, the fourth leg being provided by the joined end portions of said strip and such a leg extending outwardly of said three sided figure and from a junction of two of its sides and all of said legs being positioned on edge to provide a support means which is highly resistant to vertical deflection.

20. A range top heating unit comprising a sheathed electric heating element having a heat generating portion providing a generally plane heating surface adapted to be supported generally horizontally for underlying a vessel to be heated and said element having a structurally integral terminal leg extending from said heat generating portion and underlying the latter adjacent the perimeter of said heating surface for conducting electric current to said heat generating portion, and support means underlying and supporting said heat generating portion and in turn adapted to be supported by the range, said support means being connected with a part of said heat generating portion spaced from said terminal leg for restricting elevation of such heat generating portion part relative to said support means to thus maintain such heat generating portion part in position adjacent said support means, said support means also providing an abutment overlying and engaging said terminal leg to restrict elevation thereof relative to said support means and consequent elevation relative to said support means of the adjoining structurally integral part of said heat generating portion.

21. A range top heating unit comprising an electric heating element adapted to be positioned generally horizontally for supporting a vessel to be heated, pintle means supported by the range, and means connected with said element and providing a hook whose bight portion rests upon said pintle means to provide a hinge about which said element is shiftable toward and away from the latter's vessel supporting position, said hook having a downwardly facing opening larger than the thickness of said pintle means to provide for ready disassembly of said element with the range.

22. A heater assembly, comprising an elongated sheathed electric heating element convoluted to provide a spiralled plane heating surface, and a support for said heating element having a closed geometrical shape and disposed against one side of said heating element, adjoining sides of said support being angularly disposed to extend cross-wise of the convolutions of said heating element and beyond the outermost convolution of said heating element and being connected by rounded corner portions which provide supporting abutments.

23. A heater assembly, comprising an elongated sheathed electric heating element convoluted to provide a spiralled plane heating surface, and a support for said heating element formed of strip-like material to a triangular shape and disposed edgewise against one side of said heating element, the legs of said triangular shape extending cross-wise of the convolutions of said heating element, the junction between two adjoining legs being disposed closer to the center of said heating element than the junction between the other legs.

24. The construction according to claim 23 and further including body means secured to said support adjacent to the junction of said two adjoining legs.

25. The construction according to claim 23 including body means secured to said support adjacent to the junction of said two adjoining legs, the junctions of the other adjoining legs extending beyond the outermost convolution of said heating element to provide supporting abutments.

26. The construction according to claim 23 wherein said two adjoining legs are joined by a rounded corner, and a body secured to said support and having a rounded side surface fitting into said rounded corner.

27. A heater assembly, comprising an elongated sheathed electric heating element convoluted to provide a spiralled plane heating surface, and a support for said heating element formed of strip-like material formed to a geometrical shape and disposed edgewise against one side of said element, said support including a leg portion extending cross-wise of the convolutions of said heating element, said leg portion including longitudinally separable portions connected to said heating element.

28. The construction of claim 27 wherein at least certain of the heating element convolutions are provided with loop members and wherein one of said longitudinally separable portions is assembled with said support by disposing it within said loop members and the other of such portions is bent to maintain assembly of said first named portion with said loop members.

29. A heater assembly for use with a range having a top wall formed with an opening, comprising a vertical wall adjacent the opening and having a horizontally elongated slot therethrough, a spider member, a spiraled sheathed electric heating element carried by said spider member and normally supported by the latter in horizontal heating position in alignment with said opening, and tongue means connected to said spider member and having a portion of the same cross-sectional outline as said slot and fitting complementarily therewithin.

30. The construction according to claim 29 wherein said tongue means is formed with abutments engaging said vertical wall to limit the amount said tongue means may be inserted through said horizontal slot.

31. The construction according to claim 29 wherein said tongue means is insertable within and removable from said horizontal slot from one side of said vertical wall and provides first abutment means for engaging said one wall side to limit the amount said tongue means may be inserted through said slot and second abutment means for engaging the other side of said vertical wall to prevent unintentional withdrawal of said tongue means from said slot.

32. The construction according to claim 29 wherein said tongue means is insertable within and removable from said horizontal slot from one side of said vertical wall and provides first abutment means extending transversely of said tongue means for engaging said one wall side to limit the amount said tongue means may be inserted through said horizontal slot and second abutment means extending transversely of said tongue means for engaging the other side of said vertical wall to prevent unintentional withdrawal of said tongue means from said slot, said tongue means being shiftable within said slot to align said second abutment means therewith and provide for intentional withdrawal of said tongue means from said slot.

33. A heater assembly for a range, comprising a tubular portion carried by the range top and including a vertical annular wall having a horizontal slot extending therethrough, a spider member comprising a plurality of flat connected arms, a convoluted sheathed heating element carried by said spider member, said element being normally supported by said spider member in horizontal heating position within the compass of said annular wall, and a sheet metal member connected to one of said spider arms and having a tongue fitting within said horizontal slot.

34. The construction according to claim 33 wherein said sheet metal member provides for pivotal movement of the connected spider member and heating element from horizontal heating position to an upright non-heating position.

35. A heater assembly comprising an apertured stove panel having a tubular wall depending therefrom, a horizontal pintle extending inwardly from said tubular wall, an elongated sheathed electric heating element convoluted to provide a generally plane heating surface normally disposed in horizontal heating position within the compass of said tubular wall, and a sheet metal strip connected at one end to said heating element and having a hook at its other end detachably engaging behind said pintle to hold said strip and heating element assembled with said wall, said hook cooperating with said pintle to provide a hinge joint about which said heating element may be swung to and from said normal horizontal position.

References Cited in the file of this patent

UNITED STATES PATENTS

| | | |
|---|---|---|
| 2,502,988 | Price | Apr. 4, 1950 |
| 2,548,183 | Walton et al. | Apr. 10, 1951 |
| 2,571,274 | McOrlly | Oct. 16, 1951 |
| 2,725,456 | Weyrick | Nov. 29, 1955 |